US012626270B2

(12) United States Patent
　　Gallo et al.

(10) Patent No.:　US 12,626,270 B2
(45) **Date of Patent:　\*May 12, 2026**

(54) TARGETED REAL-TIME OFFERS LEVERAGING SERIALIZED QR CODES

(71) Applicant: E. & J. Gallo Winery, Modesto, CA (US)

(72) Inventors: Ernest J. Gallo, Modesto, CA (US); Benjamin S. Bradbury, Modesto, CA (US)

(73) Assignee: E. & J. Gallo Winery, Modesto, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/931,904

(22) Filed: Oct. 30, 2024

(65) Prior Publication Data

US 2025/0054016 A1　Feb. 13, 2025

Related U.S. Application Data

(63) Continuation of application No. 17/570,171, filed on Jan. 6, 2022, now Pat. No. 12,165,167.

(51) Int. Cl.
　　G06Q 30/0207　(2023.01)
　　G06Q 30/0283　(2023.01)
　　H04W 4/029　(2018.01)
(52) U.S. Cl.
　　CPC ..... G06Q 30/0225 (2013.01); G06Q 30/0283 (2013.01); H04W 4/029 (2018.02)
(58) Field of Classification Search
　　CPC ....................... G06Q 30/0225; G06Q 30/0207
　　See application file for complete search history.

(56) References Cited

U.S. PATENT DOCUMENTS

| 2004/0210481 A1* | 10/2004 | Quinlan | ............. | G06Q 30/0211 |
| | | | | 705/14.27 |
| 2010/0161399 A1* | 6/2010 | Posner | ............... | G06Q 30/0234 |
| | | | | 705/14.34 |

(Continued)

OTHER PUBLICATIONS

Lei Fu, "Design of QR code-based Mall shopping guide system," International Conference on Information Science and Technology, Nanjing, China, 2011, pp. 450-453. URL: https://ieeexplore.ieee.org/stamp/stamp.jsp?tp=&arnumber=5765288&isnumber=5765065 (Year: 2011).\*

(Continued)

*Primary Examiner* — Ilana L Spar
*Assistant Examiner* — Melinda Gieringer
(74) *Attorney, Agent, or Firm* — Dentons US LLP

(57)　ABSTRACT

The subject matter of this disclosure relates to a method and a system for providing and managing post-purchase rebates and other commercial offers. An example method includes: receiving a notification indicating that a consumer has purchased a product at a store and is requesting a discount for the product, wherein the notification is received in response to a client device of the consumer scanning a QR code on the product; determining that the client device scanned the QR code when the client device was outside of a physical boundary for the store; confirming that the consumer has purchased the product; and providing the consumer with the discount.

20 Claims, 8 Drawing Sheets

100

Promotion Management Engine
104

Store(s)
108

Network
110

Client Device
102a

Client Device
102b

• • •

Client Device
102n

Financial Institutions
106

(56)                    References Cited

U.S. PATENT DOCUMENTS

| | | | |
|---|---|---|---|
| 2012/0130817 A1* | 5/2012 | Bousaleh | G06Q 30/02 |
| | | | 705/14.58 |
| 2014/0025470 A1* | 1/2014 | Berman | G06Q 30/0235 |
| | | | 705/14.26 |
| 2014/0143055 A1* | 5/2014 | Johnson | G06Q 30/0257 |
| | | | 705/14.55 |
| 2014/0214519 A1* | 7/2014 | Ekster | G06Q 30/0234 |
| | | | 705/14.34 |
| 2017/0169422 A1* | 6/2017 | Ye | H04L 9/3234 |
| 2019/0385145 A1* | 12/2019 | Abdelkader | H04W 4/021 |
| 2020/0184486 A1* | 6/2020 | Spoor | G06Q 10/0833 |
| 2021/0174426 A1* | 6/2021 | Isaacson | H04W 12/37 |
| 2021/0264401 A1* | 8/2021 | Løken | G06Q 20/4015 |
| 2022/0391938 A1* | 12/2022 | Sridhar | G06Q 30/0224 |
| 2023/0196401 A1* | 6/2023 | Cheong | G06Q 20/3276 |
| | | | 705/14.33 |
| 2024/0144350 A1* | 5/2024 | Bhatia | G06Q 30/0641 |

OTHER PUBLICATIONS

Fu, L., "Design of QR code-based Mall shopping guide system," International Conference on Information Science and Technology, Nanjing, China, 2011, pp. 450-453.

* cited by examiner

100

600

TARGETED REAL-TIME OFFERS LEVERAGING SERIALIZED QR CODES

CROSS REFERENCE TO RELATED APPLICATIONS

This application is a continuation of U.S. patent application Ser. No. 17/570,171, filed Jan. 6, 2022, the entire disclosure of which is incorporated herein by reference.

BACKGROUND

Commercial promotions involving coupons, discounts, special offers, rebates, and the like are a common marketing strategy, particularly for consumer goods sold at groceries, drug stores, liquor stores, and discount stores. Product suppliers or producers can use commercial promotions to introduce new products, promote new and existing products, and increase sales. Commercial promotions can be utilized in a three-tier distribution system, which can involve or include the following three tiers: (i) suppliers (alternatively referred to as "producers" or "manufacturers"), (ii) distributors (alternatively referred to as "wholesalers," "partners," or "wholesale distributors"), and (iii) retailers (alternatively referred to as "merchants").

Online access to commercial communications/promotions from merchants, product sellers, and manufacturers has become commonplace and can allow consumers to receive promotional offers and make purchases from the convenience of their own homes. Many people receive commercial communications or other promotional materials on their mobile devices, in their email accounts, or through other electronic means.

SUMMARY

In general, the subject matter of this disclosure relates to a method and a system for providing and managing post-purchase rebates and other commercial promotions or offers. In one aspect, a computer-implemented method includes: receiving a notification (e.g., at a server computer for a promotion management engine) indicating that a consumer has purchased a product at a store and is requesting a discount for the product, wherein the notification is received in response to a client device of the consumer scanning a QR code (e.g., a serial QR code) on the product; determining that the client device scanned the QR code when the client device was outside of a physical boundary for the store; confirming that the consumer has purchased the product; and providing the consumer with the discount.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

Figure 1:
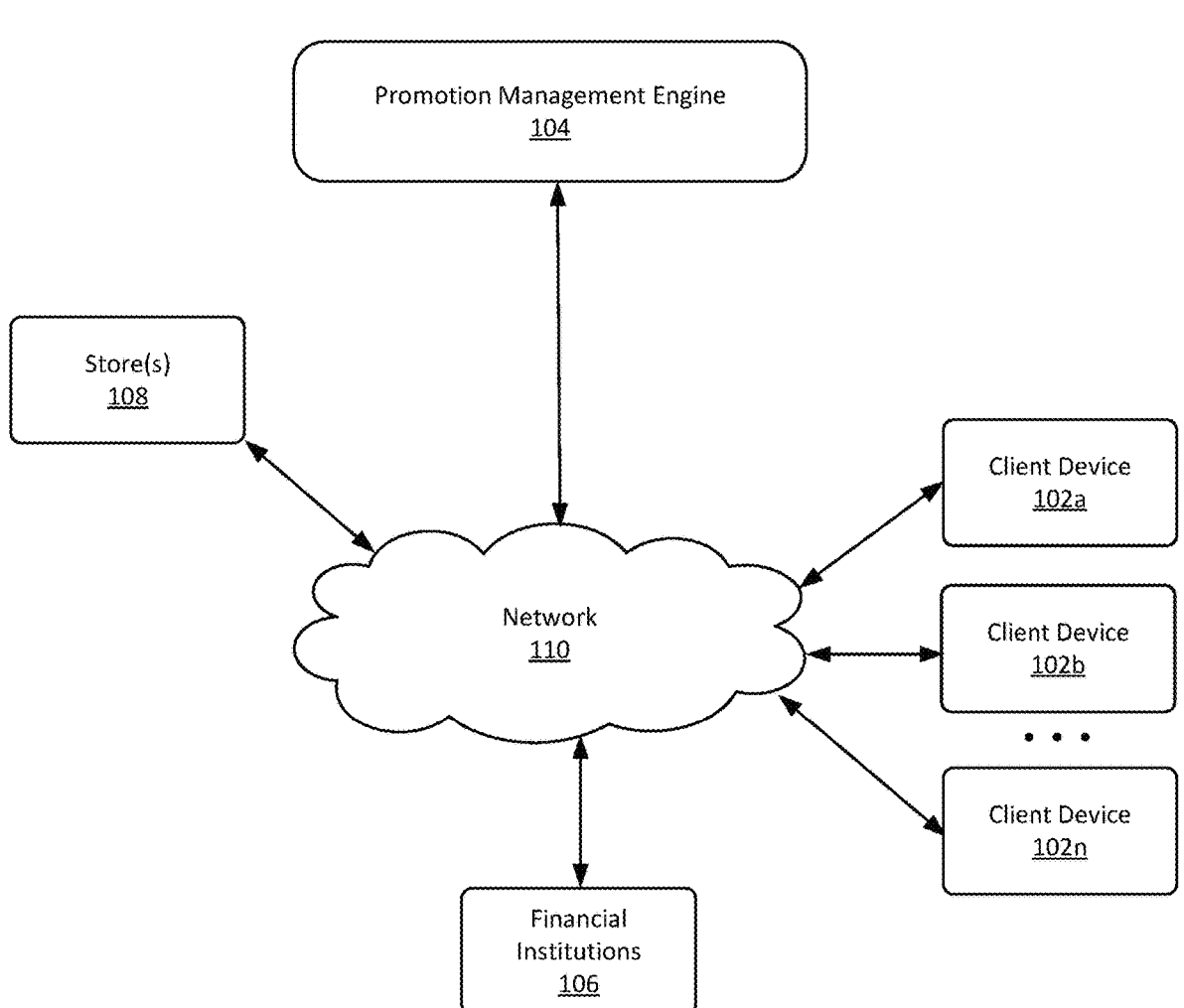
FIG. 1 is a schematic diagram of a promotion management system, according to some embodiments.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In general, previous approaches for implementing commercial promotions received through electronic or other means are not responsive to a consumer's interests, not compelling to the consumer, too laborious to follow (e.g., a consumer needs to go through a long list to find a desired coupon and then download the coupon to a consumer account), limited to virtual stores and not physical brick-and-mortar stores, or not received by the consumer at a proper time (e.g., received too early or after a consumer is no longer interested in purchasing a product). For example, promotions implemented with paper (e.g., paper mail-in rebates and instant rebates) have been widely used but are expensive to produce, even more expensive to distribute, and sometimes not well-targeted, due to the indirect nature of such promotions. Further, merchants who wish to entice consumers with offers for discounted products may require consumers to be physically present inside the merchants' stores (e.g., to view advertisements inside the stores).

In addition, prevention of fraudulent use of these promotions (e.g., a promotion code is scanned or redeemed multiple times) is complicated and time consuming, for both consumers and merchants (or other offer providers). For paper promotions, previous fraud prevention measures can require, for example, a consumer to submit: a picture of a receipt, an original copy of a receipt, a picture of a Universal Product Code (UPC), or the UPC itself (e.g., removed from a product label). Fraud prevention may also require offer providers to review or monitor the number of redemptions by consumer address. For digital promotions, suppliers or other offer providers may check against device ID, limit multiple redemptions of a given offer within a mobile application, and/or require a consumer to scan a UPC barcode. Some offer providers may ask consumers to integrate their loyalty accounts onto an offer platform.

To complicate matters for suppliers (e.g., product manu-
facturers), the relationship with the consumer is generally
managed by retailers, and retailers may control product
prices (e.g., IBOTTA rewards may involve a partnership
with a retailer). Further, indirect methods of couponing, such
as paper mail-in rebates (MIRs) and instant rebates, are
generally not well-targeted. To deliver more targeted offers
(e.g., through retailer loyalty programs or CATALINA point-
of-sale (POS)), a supplier may need to be integrated into a
retailer's financial system. Such integration is challenging,
however, because many retailers do not want to partner with
a supplier. It can also be difficult to configure reward
cumulations for a single purchase of a number of the same
promoted products, or multiple purchases of such products
over a period of time or over multiple retailers.

Other impediments exist for implementing and managing
commercial promotions. For example, smaller retailers may
not have all the information or resources needed for fraud
prevention, such as production description and/or code.
Further proof of fraud may be needed in such instances;
otherwise, a supplier may choose to simply accept a receipt
knowing that it may be fraudulent. In addition, mailing a
UPC may require a product label to be destroyed, which can
taint the aesthetics of the product. Still further, with previous
approaches, it is difficult for a supplier to implement a
dynamic and/or consumer-targeted price through a retailer
that the supplier does not control and/or is not tied to the
supplier's information system. Retailer fraud can occur
when a retailer manufactures receipts for instant or mail-in
coupons. The receipt may no longer be a limiting factor of
redemption in such instances. In general, retailer and/or
consumer fraud can occur when a purchase of a product is
falsely claimed. One type of fraud, referred to herein as
"farming," can involve a concerted effort to run up fake
transactions, pump out fake receipts, and/or redeem fraudu-
lent multiple offers at once.

To address the above problems, the systems and methods
described herein can utilize cognitive computing and/or
predictive modeling to perform various actions when a
coupon/discount-based transaction and redemption are
anticipated. To do so, data may be collected and stored by
one or more backend components (e.g., a promotion man-
agement system or server), where the data may include a
consumer's financial account, the consumer's spending hab-
its, the consumer's demographic data, and/or location data
associated with the consumer's client device. Data may also
be collected for other consumers in a particular region, and
such data may include demographic data and/or transaction
data (e.g., describing spending habits) of the other consum-
ers at various retailers. Once a consumer's proximity to a
particular retailer and time of transaction is determined, the
one or more backend components may leverage demo-
graphic data and/or spending habits of the consumer and/or
other consumers to determine an anticipated purchase price
for a product that the consumer (alternatively referred to as
a "user" or "customer") is likely to purchase at that particu-
lar retailer at that moment. The anticipated purchase price
may reflect a real-time price adjustment of a retail price by
offering a certain promotion or coupon/reward/rebate spe-
cific to the consumer, for example, based on a location, time
of day, and/or spending habits of the consumer. This antici-
pated purchase price may then be delivered to that particular
retailer (e.g., a price managing system of the retailer) and/or
to the consumer's client device so that the consumer knows
in advance what the actual cost will be if the product is
purchased at that moment. Alternatively or additionally, in
some examples, the consumer may be informed that the promotion or coupon can be redeemed after the transaction
is completed, as further described in detail below.

In some examples, the systems and methods described
herein can utilize a serial quick response (QR) code com-
bined with a serial QR registry and geofencing (with or
without a receipt for proof of purchase) to prevent or avoid
fraudulent redemption or farming of coupons or other types
of promotions. For example, when geolocation data indi-
cates that a large quantity of coupon or offer redemptions are
being requested from a single location (e.g., a store), the
systems and methods can intervene and stop further redemp-
tions from that location. This can involve, for example,
sending alerts to system operators and/or deactivating the
redemption process for that location or one or more devices
associated with the location. Guardrails or threshold values
may be set for locations to manage risk. For example, when
a number of redemptions at a location exceeds a threshold
value for a given period of time, further redemptions for that
location can be prevented or stopped, at least temporarily.
This can give system operators time to determine if the
redemptions are valid or fraudulent. Additionally or alter-
natively, the QR registry can be used to prevent farming,
because each product item (e.g., each bottle of wine) can be
uniquely identified with a serial QR code, and the QR
registry can reveal when more than one offer redemption is
attempted for a given product item.

To prevent fraudulent redemption, transaction data (e.g.,
from a receipt or QR registry) including, for example, the
actual purchase price for the product and/or the anticipated
purchase price including the promotion coupon may be
collected by one or more backend components. The trans-
action data may indicate that the consumer has purchased
the product. Location data may be also collected for the
consumer based on a location of the consumer's client
device. Once the consumer is detected to have left the store
(e.g., left the physical brick-and-mortar store and/or its
parking lot), based on the location data, the one or more
backend components may initialize an offer redemption
process. For example, when the consumer's client device
scans a QR code on the product, the one or more backend
components may automatically send a request to transfer
money from a clearing house (e.g., a third-party financial
institution) to a financial account associated with the con-
sumer, to complete the coupon redemption process.

The present disclosure has important advantages and
benefits over existing commercial promotion systems. For
example, the systems and methods can use cognitive com-
puting and/or predictive modeling to determine an antici-
pated purchase price (e.g., a maximum price) that a specific
consumer may be willing to pay for a product at a particular
retailer at a specific moment. The cognitive computing
and/or predictive modeling can take into consideration a
variety of factors (e.g., time of a day), and the anticipated
purchase price can be adjusted by considering demograph-
ics, spending habits, or other characteristics of the specific
consumer. The generated anticipated purchase price may
thus be flexible and/or can be adjusted in real-time, which is
generally not possible with existing commercial promotion
systems, which can utilize a fixed promotion price. Other
features and advantages of the systems and methods
described herein can include fewer or no fraudulent redemp-
tions of promotion coupons, more active engagement
between consumers and manufacturers, etc.

In various examples, the systems and methods described
herein can allow consumers to receive discounts on products
through use of serialized QR codes. For example, when a
consumer purchases a product at a store, the consumer can leave the store and use the consumer's client device (e.g., a mobile device) to scan a serial QR code on the product or product packaging. In response to the scan, a promotion management engine can receive a notification indicating that the consumer purchased the product at the store and is requesting a discount for the product. The promotion management engine can determine, based on location data for the client device, that the client device scanned the QR code when the client device was outside of a physical boundary for the store. The promotion management engine can then send a notification to the client device requesting the consumer to provide a purchase confirmation (e.g., a receipt) for the product. The consumer can then use the client device to scan or take a picture of a receipt associated with the purchase of the product, and the client device can send the scan or picture of the receipt to the promotion engine. When the promotion engine receives the scan or picture of the receipt, the promotion engine can provide the consumer with the discount (e.g., a rebate), by providing funds to an account of the consumer. Alternatively or additionally, a registration (e.g., a QR-based registration) may have occurred during the payment (e.g., when a digital payment was performed by the consumer). The registration can allow the promotion management engine to confirm the purchase (e.g., by checking the QR registry) without requiring the consumer to submit a receipt.

FIG. 1 is a schematic diagram of an exemplary promotion management system 100 in accordance with one aspect of the present disclosure. As illustrated, promotion management system 100 may include one or more client devices 102a . . . 102n (which together or individually may be referred to as client device 102), a promotion management engine 104, one or more financial institutions 106 (e.g., a bank and/or credit card payment network), one or more stores 108 (e.g., merchants or other businesses that sell products), and a network 110. Promotion management system 100 may include additional or fewer components than those illustrated in FIG. 1. Promotion management engine 104 may communicate with several client devices 102, each of which can be operated by a respective consumer, to track consumer locations and/or receive other types of information, such as purchase histories, etc. Promotion management engine 104 may monitor data received from each client device, such that the spending habits of the associated consumer may be determined.

Store 108 may be any physical brick-and-mortar store or virtual online store. In one example, store 108 may have or be associated with a boundary, which may include a wall or other physical structure defining a location of store 108. For example, the boundary may represent or define a geofence encompassing an area or a range of geographic coordinates (e.g., latitude and longitude) for the brick-and-mortar store and/or a parking lot for the store 108. When a client device 102 crosses the boundary (e.g., to enter or leave the store 108), promotion management engine 104 may determine that a consumer associated with the client device 102 has also crossed the boundary.

Network 110 may be configured to facilitate communications between one or more client devices 102, one or more financial institutions 106, one or more stores 108, and/or promotion management engine 104. Network 110 may be implemented as a local area network (LAN), a metropolitan area network (MAN), a wide area network (WAN), or any suitable combination of local and/or external network connections, and/or may include any suitable number of nodes, additional wired and/or wireless networks that may facilitate one or more landline connections, Internet service provider (ISP) backbone connections, satellite links, a public switched telephone network (PSTN), etc. In the present disclosure, network 110 may provide one or more client devices 102 with connectivity to network services, such as Internet services.

Client device 102 may be implemented as any suitable communication device. For example, client device 102 may be a smartphone, a personal digital assistant (PDA), a tablet, a laptop, a wearable electronic device, a mobile device, or any other computing device. In some embodiments, client device 102 may be configured to communicate using any suitable communication protocols, such as Wi-Fi, cellular, BLUETOOTH, NFC, RFID, etc. For example, client device 102 may be configured to communicate with network 110 through a cellular communication protocol to send data to and/or receive data from one or more financial institutions 106 and/or promotion management engine 104. In some embodiments, client device 102 may be configured to capture or scan a QR code using a camera or other sensor. In some embodiments, client device 102 may be configured to acquire and/or share location information for client device 102 in real-time, e.g., through a global positioning system.

Data collected by client device 102 may thus include location information of the client device 102, an identification of a specific product (e.g., containing a QR code), purchase information, payment information, and the like. In some embodiments, data collected by client device 102 (e.g., during a certain period such as a few weeks or months) may include or be used to determine (e.g., by the promotion management engine 104) the transaction history of a consumer, frequently visited stores of the consumer, a normal shopping schedule of the consumer, etc. Client device 102 may communicate with network 110 to send data collected by client device 102 to promotion management engine 104 and/or one or more financial institutions 106.

Data received by client device 102 from one or more financial institutions 106 and/or promotion management engine 104 may include messages or other data informing a consumer of a promotion, an offer, a suggested course of action, and/or a status of a course of action being taken regarding an offer redemption. For example, when the consumer purchases a product, the consumer may be instructed to scan a QR code and/or a purchase receipt for the product when the consumer is outside of the store 108 (e.g., outside a boundary for the store 108). In some examples, the consumer may be instructed to scan a receipt if the store 108 did not provide the receipt or other purchase confirmation data to promotion management engine 104. When the promotion management engine 104 is able to confirm the purchase of a product, the consumer may be notified that a coupon redemption has been automatically initialized or will be initialized once the consumer has left the boundary of the store 108, according to real-time location information for the client device. In some embodiments, an indication that a money transfer is pending, an indication that a money transfer has been made, details of the money transfer such as the transferred amount of money, etc., may be sent to client device 102 (e.g., from financial institutions 106).

Promotion management engine 104 may be configured to communicate using suitable communication protocols. For example, promotion management engine 104 may be configured to communicate with client device 102 using a cellular communication protocol. For example, promotion management engine 104 may receive data from client device 102 indicating a current geographic location of client device 102, a store that client device 102 is currently visiting, demographic information associated with a consumer of client device 102, spending habit information of the consumer, etc. Promotion management engine 104 may transmit notifications, messages, etc., to client device 102, which may, in turn, be displayed for the consumer on the client device.

In some embodiments, promotion management engine 104 may be configured to communicate with one or more financial institutions 106, for example, to send data to and/or receive data from the one or more financial institutions 106. For example, a consumer may set up permissions authorizing promotion management engine 104 to access financial data of a consumer account held at one or more financial institutions 106 and/or to make deposits in the account on the consumer's behalf. Once such authorizations are set up, promotion management engine 104 may be configured to actively request fund transfers from one or more financial institutions 106 to consumer accounts.

Figure 2:
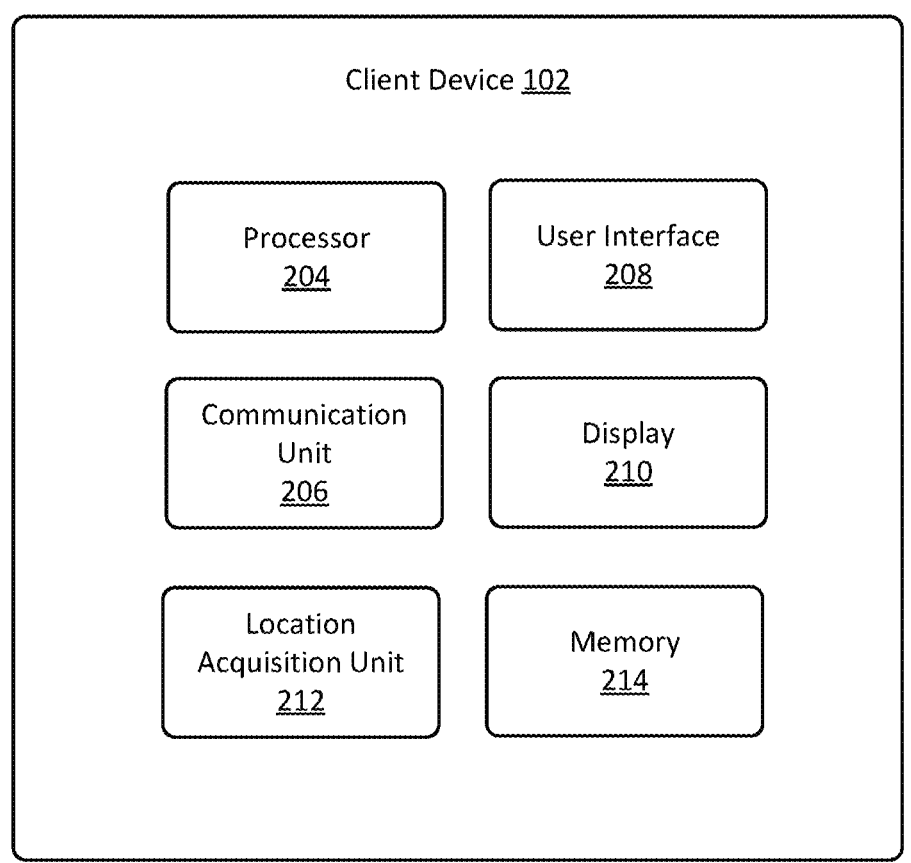
FIG. 2 is a schematic diagram of a hardware structure of a client device, according to some embodiments.

Further details about client device 102 and promotion management engine 104 are provided below with respect to FIG. 2 and FIG. 3, respectively. FIG. 2 shows one example of a hardware structure 200 of client device 102. As shown in FIG. 2, client device 102 may include one or more processors 204, a communication unit 206, a user interface 208, a display 210, a location acquisition unit 212, and a memory 214.

Communication unit 206 may be configured to facilitate data communications between client device 102 and one or more of network 110, financial institutions 106, and/or promotion management engine 104. Communication unit 206 may be configured to facilitate data communications based upon the particular component and/or network with which client device 102 is communicating. Such communications may facilitate the transmission of location data and/or other data from client device 102 that is utilized by promotion management engine 104 to provide enhanced promotion management for a consumer associated with client device 102. Communication unit 206 may be implemented with any suitable combination of hardware and/or software. For example, communication unit 206 may be implemented with any suitable number of wired and/or wireless transceivers, network interfaces, physical layers (PHY), ports, antennas, etc.

User interface 208 may be configured to facilitate consumer interaction with client device 102. For example, user interface 208 may include a user input device such as an interactive portion of display 210, an external hardware keyboard configured to communicate with client device 102 via a wired or a wireless connection, an external mouse, or any other suitable user input device.

Display 210 may be implemented as any suitable type of display that facilitates consumer interaction. This includes capacitive touch screen display, resistive touch screen display, etc. In some embodiments, display 210 may be configured to work in conjunction with user interface 208 and/or one or more processors 204 to detect consumer inputs, to identify consumer selection of objects, to display notifications and/or suggested actions to take and/or actions that have already been taken regarding a consumer's financial account, etc.

Location acquisition unit 212 may be implemented as any suitable device configured to collect location information indicative of a current location of client device 102. For example, location acquisition unit 102 may be implemented as a satellite navigation receiver that works with a global navigation satellite system. In some embodiments, location acquisition unit 212 may be configured determine a geographic location of client device 102 based on a global positioning system (e.g., using navigational signals from one or more satellites), triangulation, or other positioning technique. In certain instances, the geographic location of client device 102 may be determined by client device 102 and sent to location acquisition unit 212.

Processors 204 may be implemented as any suitable type and/or number of processors, such as a processor in which client device 102 is implemented. In some embodiments, processors 204 may be configured to communicate with one or more of communication unit 206, user interface 208, display 210, location acquisition unit 212, and/or memory 214 to send data to and/or to receive data from one or more of these components. For example, processors 204 may be configured to communicate with memory 214 to store data to and/or to read data from memory 214.

Memory 214 may be a computer-readable non-transitory storage device, and may include any combination of volatile memory (e.g., a random-access memory (RAM)) and/or non-volatile memory (e.g., FLASH memory). In some embodiments, memory 214 may be configured to store instructions executable by one or more processors 204. These instructions may include machine-readable instructions that, when executed by one or more processors 204, cause one or more processors 204 to perform certain actions, such as data collection and data transmission.

Figure 3:
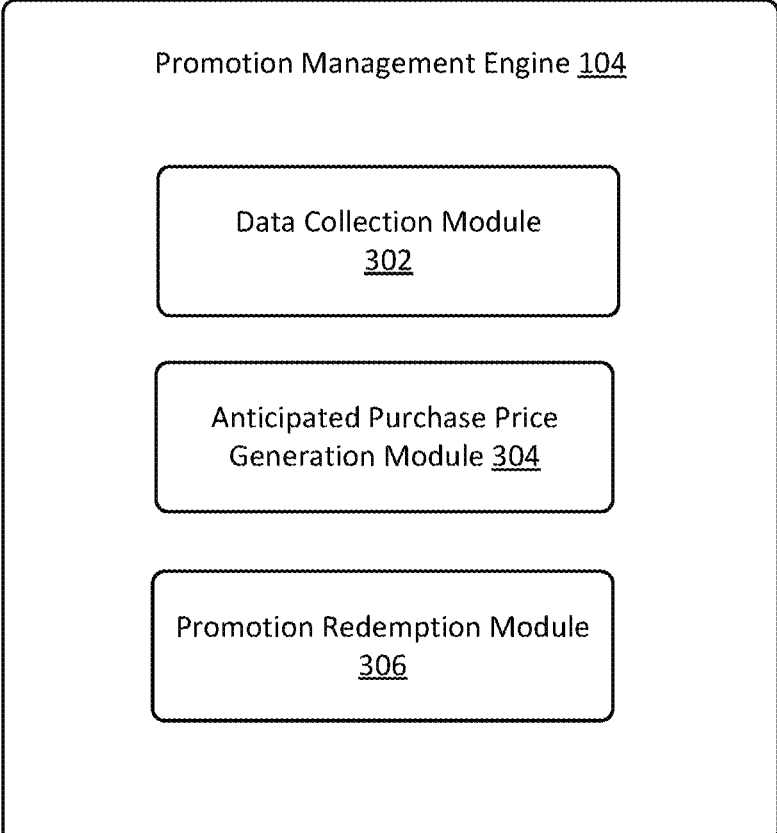
FIG. 3 is a schematic diagram of a promotion management engine, according to some embodiments.

FIG. 3 shows example modules included in promotion management engine 104. As illustrated, promotion management engine 104 may include a data collection module 302, an anticipated purchase price generation module 304, and a promotion redemption module 306.

Data collection module 302 may include hardware, software, and/or firmware that are configured to collect any data purposed for promotion management. This can include collecting data for determining an anticipated purchase price for a product for a consumer, collecting data for determining whether a promotion redemption should be initialized, and/or collecting data for determining whether a promotion has been redeemed, etc.

For example, a consumer who visits a store is typically interested in purchasing a product from the store. The product may include a serial QR code that uniquely identifies a specific product and can be used to distinguish the specific product item from other products of the same type. For example, each bottle of wine from a manufacturer may have a unique serial QR code that identifies the specific bottle (e.g., an individual bottle of Chardonnay). The consumer's client device 102 can be used to scan the serial QR code on the product. Data associated with the serial QR code can be transferred from the client device 102 to data collection module 302 of promotion management engine 104. Other information that can be transmitted (e.g., along with the QR code data) to data collection module 304 may include store information (e.g., location information of the store), a time when the QR code was scanned, and/or an identifier (e.g., phone number) of the consumer who submitted the QR code, etc. In some embodiments, data collection module 302 may collect additional information based on the data received from the client device. For example, once the consumer has been identified (e.g., based on a phone number), data collection module 302 may further collect or retrieve a profile for the consumer, including a purchase history and/or spending habit information for the consumer. In some instances, when no spending habits have been added to the consumer profile, the consumer spending habits can be generated by data collection module 302, e.g., based on a purchase history of the consumer. For example, if the purchase history indicates the consumer rarely purchases a product without a promotion, the spending habits may indicate that the consumer is a coupon seeker.

Anticipated purchase price generation module 304 may include hardware, software, and/or firmware that are configured to generate an anticipated purchase price for a specific consumer. The anticipated purchase price (which may be also referred to as "promotion price") may reflect a price (e.g., a maximum price) that a consumer will be most likely to spend, willing to spend, or expects to pay for a product at a specific moment. For example, a coupon seeker may be most likely to pay for a product at a price having a promotion offer (e.g., a coupon, rebate, reward).

Anticipated purchase price generation module 304 may use cognitive computing and/or predictive modeling to generate an anticipated purchase price for a consumer at a specific moment. For example, anticipated purchase price generation module 304 may use cognitive computing to identify how much a consumer (e.g., a coupon seeker) will be most likely or willing to pay for a product based on purchase activities of a variety of consumers during previous promotions involving different discount amounts for the product. For example, a previous promotion may indicate that a $5 discount generated an optimal demand and/or profit for the company. Based on this information, the purchase price generation module 304 may recommend a similar discount for future promotions. In another example, anticipated purchase price generation module 304 may use predictive modeling to predict how much a consumer (e.g., a coupon seeker) will be most likely or willing to pay for a product based on purchase activities of the same consumer for other products. For example, previous promotions may indicate that the consumer is responsive to discounts on other products that are 25% off or more but unresponsive to smaller discounts.

In some embodiments, anticipated purchase price generation module 304 may take additional factors into consideration when generating the anticipated purchase price (e.g., using cognitive computing and/or predictive modeling). For example, anticipated purchase price generation module 304 may take demographic information into consideration, such as local median home price, average home income, average age of the population in the area, etc. In another example, anticipated purchase price generation module 304 may take time of day into consideration when generating the anticipated purchase price. For example, a deeper promotion price may be offered during evenings, compared to mornings. Other factors considered by anticipated purchase price generation module 304 may include local storage or inventories for products, expiration dates for products in inventory, etc. For example, larger discounts can be given for products that are close to their expiration dates or for which there is an excess supply. By considering such factors, anticipated purchase price generation module 304 may generate the anticipated purchase price for a product for a specific consumer at a specific store at a specific moment. When one or more factors change, a different anticipated purchase price may be generated by anticipated purchase price generation module 304. In some examples, the anticipated purchase price may be dynamically modified as circumstances change, in real time.

In some embodiments, the generated anticipated purchase price may be delivered to the consumer instantly upon request. Continuing with the above example, when the consumer's client device 102 scans the QR code on a product (e.g., inside a store), data for the QR code may be sent immediately by client device 102 to promotion management engine 104. Anticipated purchase price generation module 304 may generate the anticipated purchase price for the consumer, and the promotion management engine 104 may immediately send the generated anticipated purchase price back to client device 102 of the consumer. The anticipated purchase price may include a retail price that the consumer will pay at the store, and a promotional offer (e.g., a reward, rebate, discount, etc.) that can be redeemed during or after the transaction. An instruction for redeeming the promotional offer may be sent to client device 102 (e.g., simultaneously). In some embodiments, the generated anticipated purchase price may be sent to a merchant device (e.g., a POS device or other computing device) owned or operated by the store (e.g., used by an employee, owner, or other agent of the store). Because the anticipated purchase price is associated with the QR code (e.g., a serial QR code) on the product item, the QR code can be used by the store to determine the anticipated purchase price during the transaction. That is, when the QR code on the product is scanned by the merchant device, the generated anticipated purchase price can be communicated to the merchant device (e.g., by the promotion management engine 104) and used in the transaction. In alternative examples, the generated anticipated purchase price is sent only to client device 102 (e.g., not to the merchant device). In such instances, the consumer may pay the retail price in the store and receive a discount later. For example, after making the purchase, the consumer can receive the discount by leaving the store premises and scanning the QR code on the product, as described herein.

Promotion redemption module 306 may include hardware, software, and/or firmware configured to control a promotion redemption process associated with a purchase of the product. In some embodiments, if the product is not purchased at the promotion price in the store, the consumer may have a chance to redeem the promotional offer or discount after the purchase. As described earlier, to prevent fraudulent redemption, a receipt may be used in such instances to confirm the purchase. The receipt may include an item number (e.g., a number associated with the QR code on the product) or a QR code that identifies the specific product item purchased by the consumer. A consumer may use client device 102 and an installed application or a web-based application associated with promotion management engine 104 to initialize a scan of the receipt. Once scanned, the client device can send an image of the receipt or information extracted from the receipt (e.g., the item number or QR code) to the promotion management engine 104, which can confirm the purchase. Alternatively or additionally, if the product is not recognized from the receipt, the consumer can confirm the purchase by scanning the QR code on the product outside a boundary of the store. For instance, if the receipt does not have a unique number or other symbol that identifies the product item, the consumer can scan the QR code on the product outside the boundary of the store, and the promotion redemption module 306 can confirm the purchase of the product (e.g., without receiving an image of the receipt or other information from the receipt). The promotion redemption process may then be automatically initialized, e.g., to request a financial institution 106 to transfer funds for the promotional offer to an account associated with the consumer.

In some embodiments, a receipt associated with the purchase of the product and/or product return may be automatically transmitted (e.g., by the store) during the transaction to promotion management engine 104, such that the consumer may not be required to scan the receipt to redeem the promotional offer. For example, after receiving the receipt from the merchant device at the store, the redemption process may be automatically initialized. In some embodiments, to prevent the consumer from redeeming a promotion for a product that is immediately returned, the redemption process may not be automatically initialized until after the consumer has left the boundary of the store or remained outside the boundary for a threshold period of time (e.g., 1 hour or 1 day). For instance, once the location information from client device 102 indicates that the consumer has left the store boundary, the redemption process may be automatically initialized. In certain examples, the redemption process may not be initialized when promotion management engine 104 receives a return receipt (e.g., from the merchant device) indicating that the consumer has returned the product.

In some embodiments, a QR registry, in conjunction with the redemption process described above, can be used to confirm a product purchase, instead of or in addition to using a receipt to confirm the purchase. The QR registry can be or include a database that stores a listing and usage history of all the serial QR codes produced and applied to products. When a serial QR code on a product is scanned and used to redeem an offer or to purchase the product, an electronic record of the serial QR code for that product can be updated in the QR registry to reflect the offer and/or purchase event, thereby preventing the same serial QR code from being used for more than one offer or purchase. In some embodiments, the QR registry may be updated with consumer information. For example, when a consumer makes a digital payment for a transaction and/or scans a QR code on the purchased product, a registry form may pop up on the consumer's mobile device. The consumer can complete the form, if desired, by adding personal information and/or information related to the purchase. The information collected through the form may be saved in the QR registry. For example, the QR registry can identify the consumer as the individual who purchased the product. This can allow the consumer to complete the redemption process described herein without having to provide a copy or image of a receipt.

It should be understood that the above anticipated purchase price generation process and the promotion redemption process are merely for illustrative purposes. The disclosed promotion management engine 104 may use other means to generate a targeted offer in real-time (e.g., using cognitive computing, predictive modeling, and/or machine learning models) or to prevent fraudulent promotion redemption.

In some examples, to be eligible for certain promotional offers described herein, a consumer may be required to create a consumer account with promotion management engine 104, one or more financial institutions 106, and/or the manufacturer for the product. The consumer account can facilitate data communications between or among the consumer, promotion management engine 104, financial institutions 106, and/or the manufacturer. The improved communications can enable more personalized offers to be generated for the consumer. Additionally, the account can improve engagement between the consumer and the manufacturer, thus improving the manufacturer's brand proposition.

Figure 4:
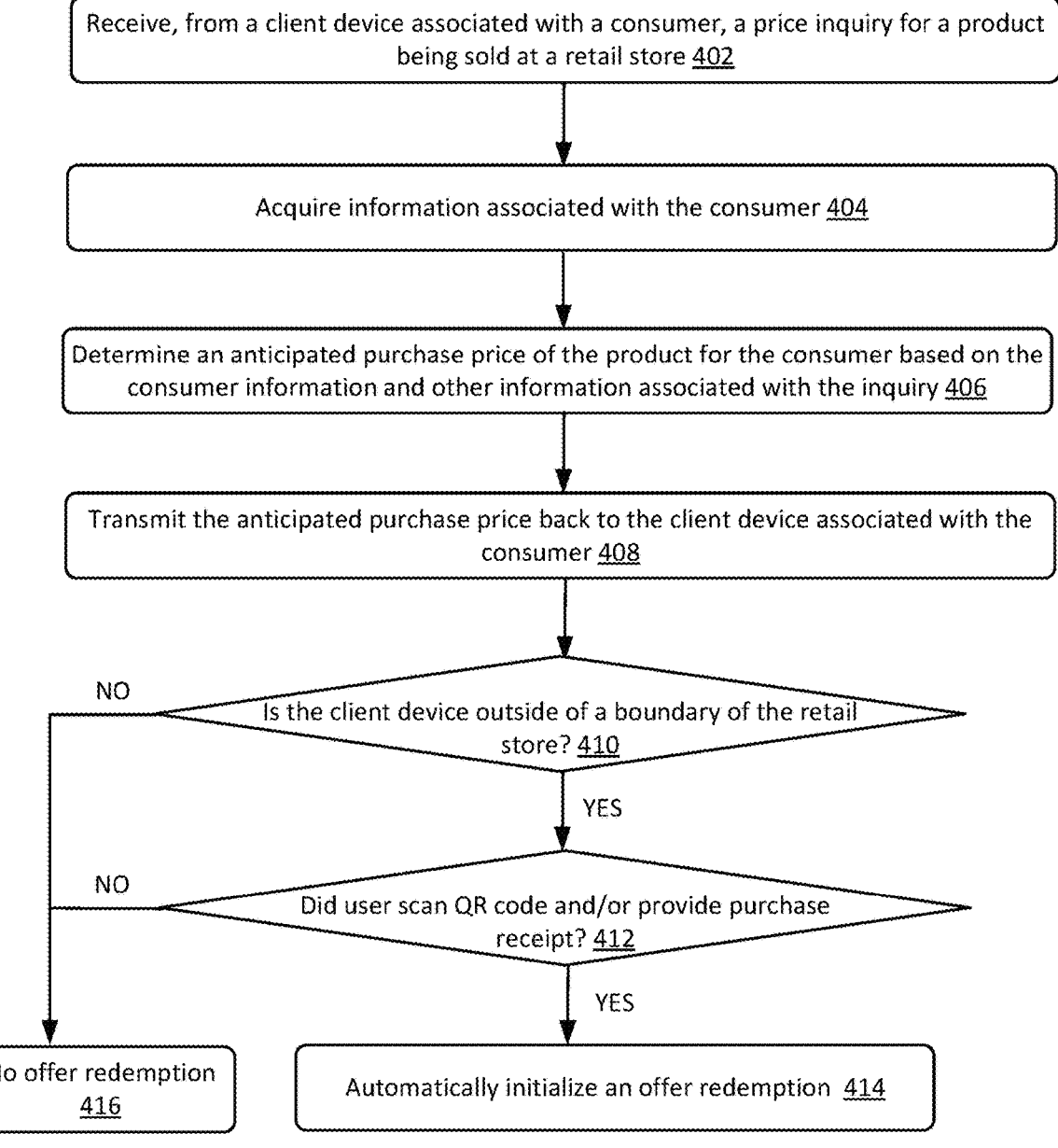
FIG. 4 is a flowchart of a method of managing commercial promotions, according to some embodiments.

FIG. 4 illustrates an example method 400 for managing online commercial promotion according to some embodiments. At step 402, a price inquiry for a product being sold at a store (e.g., a retail store) can be received from a client device associated with a consumer and/or from an application associated with the client device. For instance, the consumer can use the client device to scan a serial QR code on the product. Information for the scanned serial QR code may then be sent from the client device to one or more backend components (e.g., promotion management engine 104). The transmitted information may include the serial QR code (or related information) as well as consumer identity (e.g., phone number, consumer identifier, and/or account identifier) and other context information (e.g., time of day and location of the store). The backend components can use the transmitted information to identify the specific item associated with the scanned serial QR code.

At step 404, additional consumer information associated with the consumer can be acquired (e.g., by promotion management engine 104). For instance, based on the identity of the consumer, consumer profile information including spending habits of the consumer, historical transactions of the consumer, preferred stores of the consumer, preferred shopping times or days of the consumer (e.g., weekday or weekend, morning, afternoon, or evening) may be retrieved, collected, and/or analyzed.

At step 406, an anticipated purchase price for the product can be determined for the consumer, for example, based on the acquired consumer information and/or information associated with the product or price inquiry. For example, cognitive computing and/or predictive modeling may be employed to generate the anticipated purchase price for the consumer based on the consumer information and/or context information (e.g., time of day, store location, etc.) related to the inquiry. The generated anticipated purchase price may be a predicted price (e.g., a maximum price) that the consumer is willing to pay for the product at that moment.

At step 408, the generated anticipated purchase price can be transmitted to and displayed on the client device associated with the consumer. The anticipated purchase price can include a retail price and a promotional offer (e.g., a rebate, reward, discount, etc.). In some embodiments, an instruction for redeeming the promotional offer can be transmitted to the client device. For example, the instruction may explain how the consumer can redeem the offer (e.g., "scan your receipt or product QR code to redeem the offer when you have left the store").

At step 410, it is determined whether the client device is outside a physical boundary of the store. To prevent fraudulent offer redemption, it can be preferable to ensure that the consumer has purchased the product and not returned the product, before any offers are redeemed. Accordingly, in some instances, the systems and methods described herein can confirm that the consumer is in possession of the product (or the QR code on the product) after the consumer has left the boundary of the store. This can be accomplished, for example, by having the consumer use the client device to scan the QR code on the product and/or provide an image of a purchase receipt, when the consumer is outside of the store boundary.

At step 412, it is determined whether the client device has scanned the QR code and/or provided a copy of the purchase receipt. For instance, the consumer may be required to scan the QR code and/or the purchase receipt to confirm the purchase of the product when the consumer is outside the store boundary. Additionally or alternatively, the receipt or purchase information may have already been provided by a merchant device at the store. The system may confirm that the purchase is still valid, for example, by confirming the product has not been returned to the store (e.g., there is no return receipt for the product) after the consumer has moved outside the store boundary. Once confirmed, at step 414, an offer redemption can be automatically initialized. Alternatively, at step 416, no offer redemption may be provided.

Continuing with the above example, when the consumer scans the receipt and/or QR code outside the boundary of the store, the offer redemption may be automatically initialized (step 414). In some examples, when the receipt is received from the store, the consumer may not need to scan the receipt, as described herein. Once the offer redemption process is initialized, a money transfer may be requested to transfer funds associated with the offer (e.g., a discount) from a clearing house (e.g., one or more financial institutions) to an account associated with the consumer. The transfer of funds can be completed in seconds, minutes, hours, or a couple of days.

Further, to prevent subsequent offers for the purchased item, the QR registry can be updated to indicate that the item has been purchased and/or the associated offer has been redeemed. In some examples, the serial QR code can be removed from the QR registry, similar to how a UPC code can be cut from a label. The updated QR registry can be used to prevent additional attempts to redeem offers or discounts for the purchased item.

The above described methods and systems are for illustrative purposes and are not limiting. Different or additional methods and systems for promotion management are possible and contemplated by the present disclosure, as further described below in FIGS. 5-7.

Figure 5:
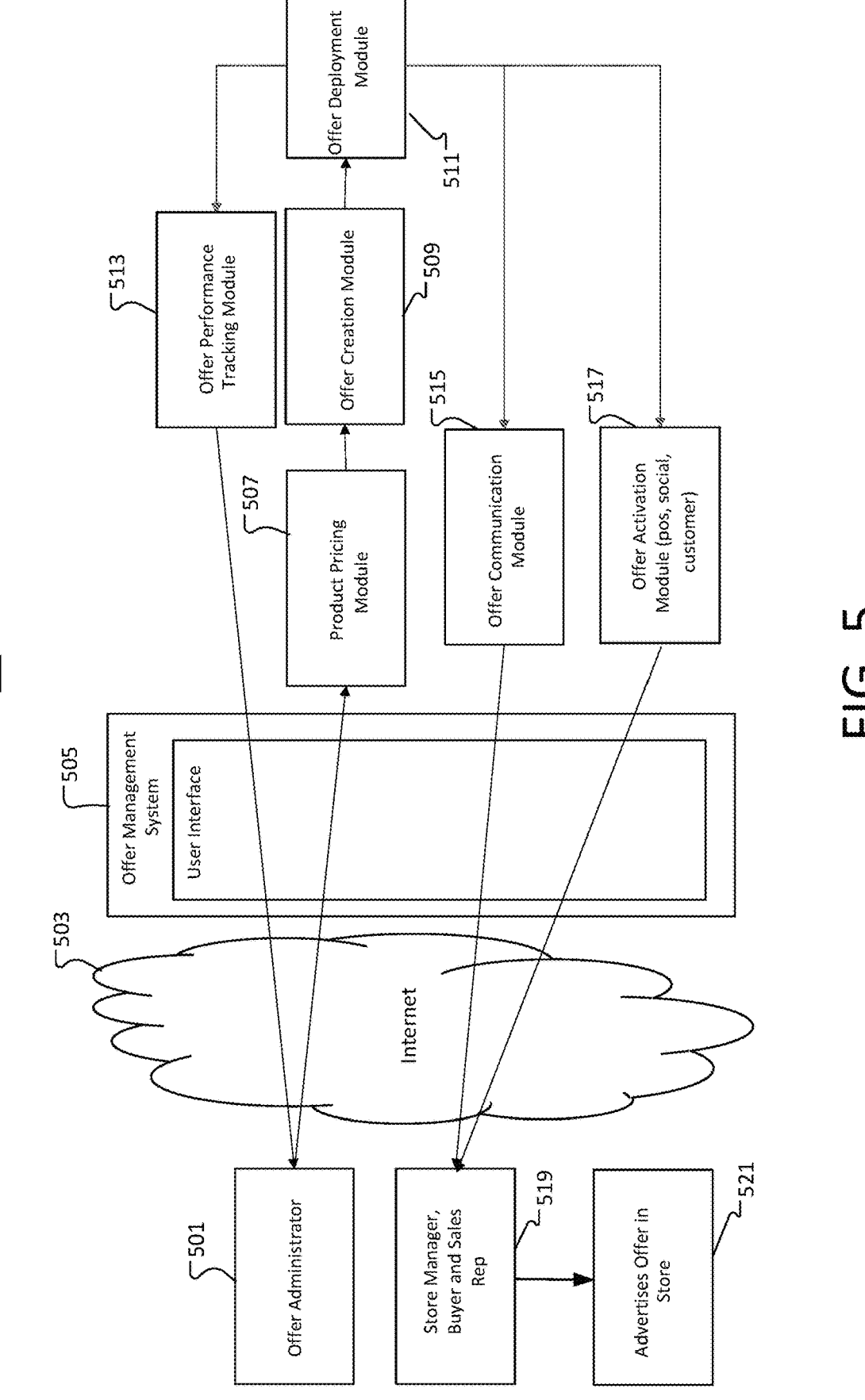
FIG. 5 is a schematic diagram of a workflow for managing a promotional offer, according to some embodiments.

FIG. 5 illustrates an example workflow 500 for managing a promotional offer. Briefly, an offer administrator 501 (e.g., an administrative user of the systems and methods described herein) may manage various processes associated with commercial promotion. The offer administrator may manage the process through a user interface of an offer management system 505 and through a network 503 (e.g., including the Internet). In some embodiments, one or more processes associated with the commercial promotion may be automatically executed by offer management system 505. For instance, a product pricing module 507 (with or without manipulation by offer administer 501) may determine or identify a retail price for one or more products managed by offer management system 505. An offer creation module 509 (with or without manipulation by offer administer 501) may create a promotional offer (e.g., rebate, reward, discount) for the one or more products. The promotional offers may be created in advance or in real-time (e.g., during a consumer's visit to a store and/or during a purchase), and the amount of the promotional offer may be predefined and/or dynamically adjusted.

Once the promotional offer is determined for a product, an offer deployment module 511 (with or without manipulation by offer administer 501) may deploy the promotional offer to a retailing system. For instance, through an offer communication module 515, offer deployment module 511 (with or without manipulation by offer administer 501) may deliver the promotional offer to the manager of a store (e.g., using a merchant device), a consumer (e.g., who requests a product price), and/or a representative 519 of a product manufacturer or distributor (e.g., a sales representative). The promotional offer can then be advertised in the store at 521 (e.g., through a price tag or display board), displayed for the sales representative, and/or presented on a client device of the consumer (e.g., in response to the consumer scanning a QR code for the product). Additionally or alternatively, offer deployment module 511 (with or without manipulation by offer administer 501) can monitor the performance of the promotion, for example, through use of an offer performance tracking module 513. Offer performance tracking module 513 (with or without manipulation by offer administer 501) may track the sales of promoted products and determine whether the promotional offer is attracting any consumers or resulting in increased purchase volumes. The tracked information can be sent back to offer administrator 501 for evaluation and analysis. A new promotion strategy may be considered by offer administrator 501 (e.g., through use of predictive models or machine learning) if necessary.

Figure 6:
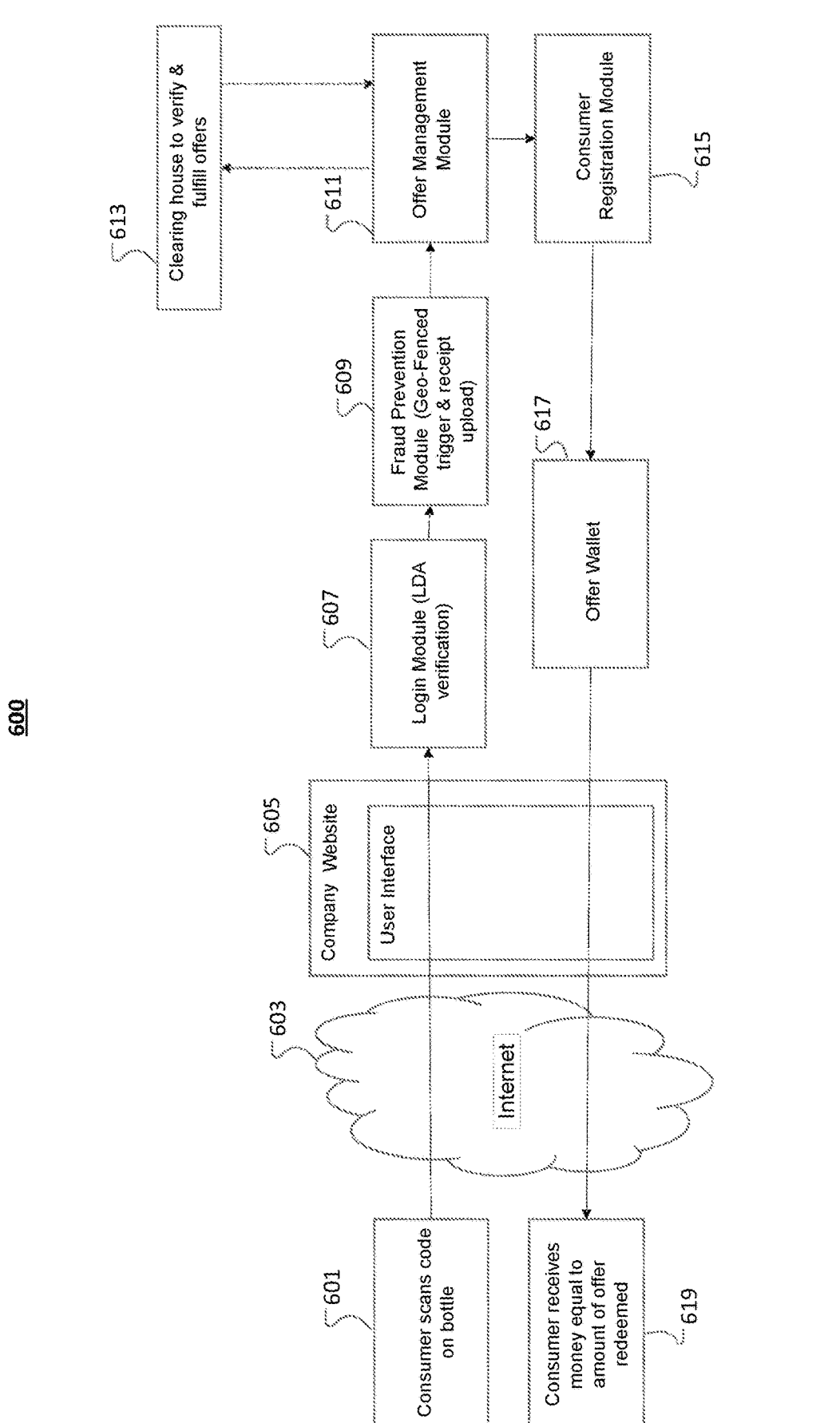
FIG. 6 is a schematic diagram of a workflow for offer redemption, according to some embodiments.

FIG. 6 illustrates an example workflow 600 for offer redemption. Briefly, at 601, a consumer (e.g., a consumer) may scan a serial QR code (e.g., outside a store). Data from the scanned QR code may be transmitted to a backend server 605 (e.g., operating a product website) through a network 603 (e.g., including the Internet). At 607, a login module may use the QR code data to perform a login module (LDA) verification, for example, to verify the product and/or a promotional offer associated with the product.

At 609, a fraud prevention module may prevent fraudulent offer redemption through use of geofence technology. For example, the fraud prevention module may require the consumer to scan the QR code and/or upload the purchase receipt when the consumer is outside of a store boundary (confirmed using location information for the consumer), or the fraud prevention module may check the QR registry to confirm the purchase and/or that the offer redemption is not fraudulent.

When the offer redemption is verified, an offer management module 611 may request the clearing house (e.g., third-party financial institution) to verify and fulfill the offer. This can include verifying the consumer account associated with the consumer and transferring the offered funds to an account associated with the consumer. Offer management module 611 can confirm the consumer account information, e.g., through consumer registration module 615, so that the funds can be properly transferred. The funds can be transferred to the consumer from an offer wallet 617, which can hold funds set aside by the manufacturer for the promotional offers. At 619, the consumer receives the funds for the offer, thereby finishing the redemption process.

Figure 7:
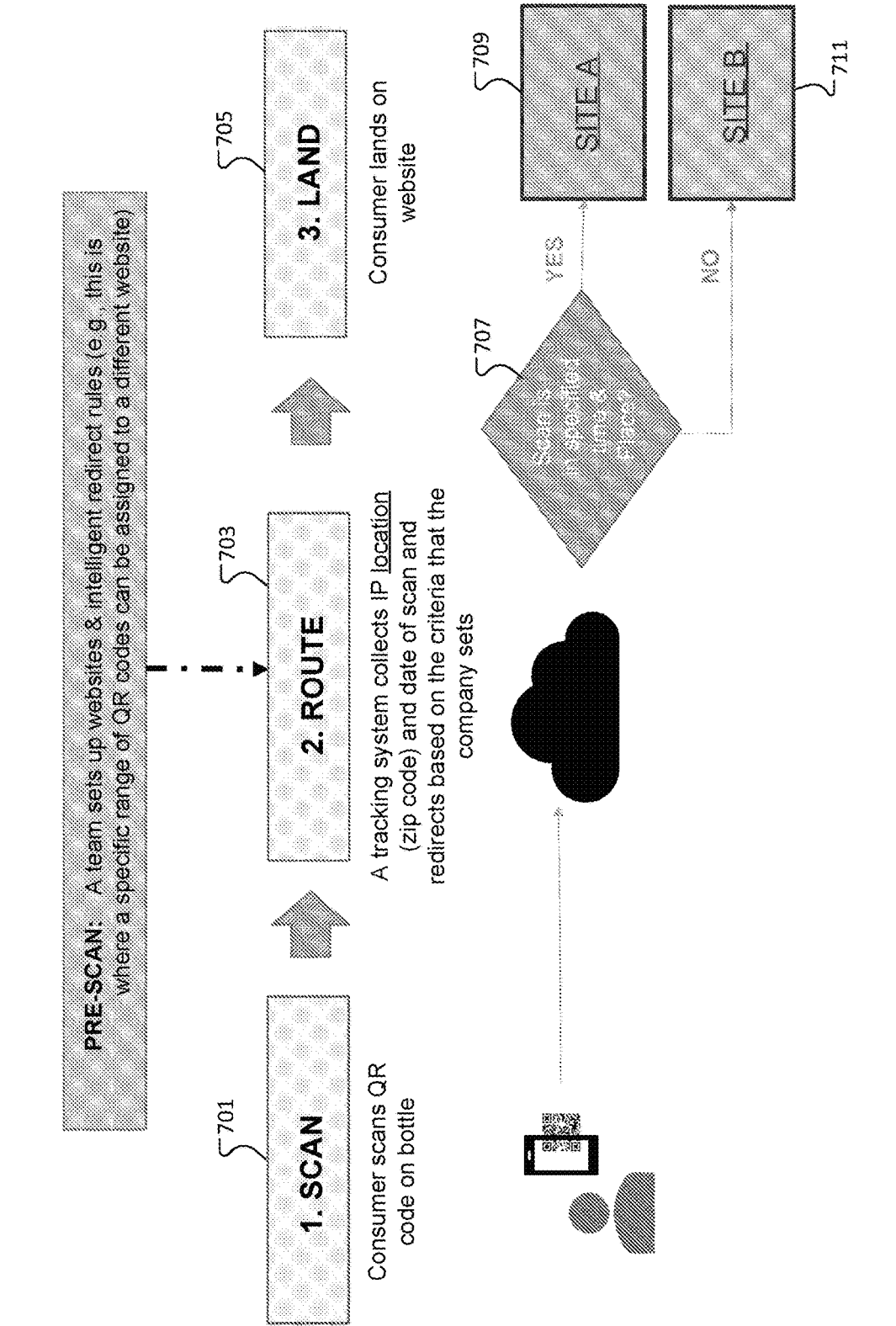
FIG. 7 is a schematic diagram of a workflow for launching a website based on a QR code scan, according to some embodiments.

FIG. 7 illustrates an example workflow 700 for launching a website based on a QR code scan. At 701, a consumer may scan a serial QR code for a product (e.g., a bottle of wine) using a client device. The scanned information may be transmitted to one or more backend components (e.g. a server associated with product promotion). At 703, location information of the client device (e.g., GPS location, IP address, etc.) may be obtained so that the location of the consumer and/or store can be determined. Meanwhile, the date and time of the QR code scan can be determined by the backend components (e.g., based on a time stamp or time of receipt).

At 705, a webpage associated with the product manufacturer or distributor may be loaded on the client device. A variety of webpages may be available and the specific webpage that is loaded can be determined based on information obtained through the QR code scan. For example, at 707, the system can determine that the QR code scan is associated with a specified time and/or location for a first promotional offer. In response, at 709, a webpage A may be loaded on the client device, which may present the first promotional offer to the client. Otherwise, at 711, if the QR code scan is not associated with the specified time and/or location, a webpage B may be loaded on the client device. Webpage B can present, for example, a second promotional offer, a product price, or other product information.

Hardware and Software Implementations

Figure 8:
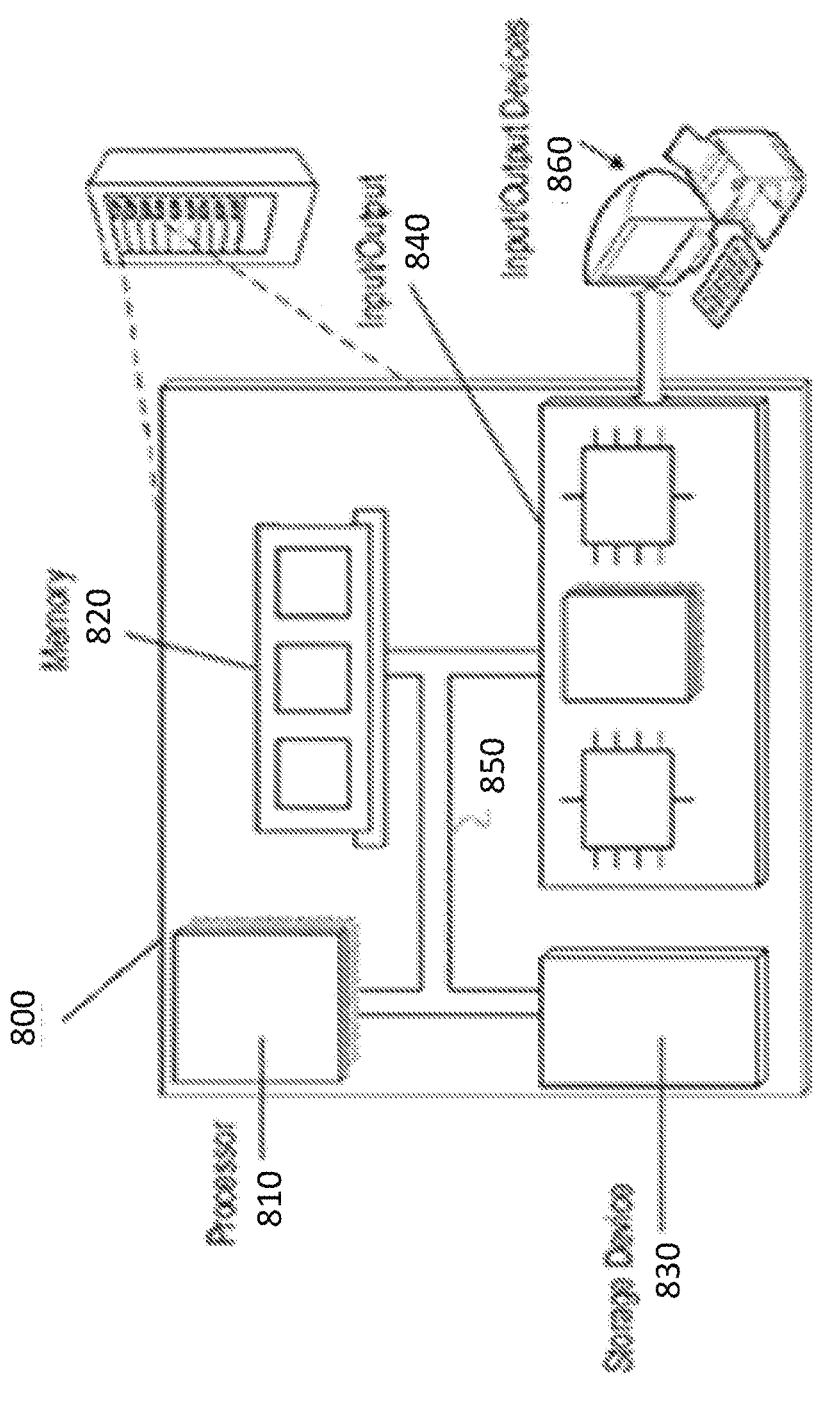
FIG. 8 is a block diagram of an example computer system that may be used in implementing the technology described herein, according to some embodiments.

FIG. 8 is a block diagram of an example computer system 800 that may be used in implementing the technology described herein. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a consumer, embodiments of the subject matter described in this specification can be implemented on a computer having a display device, e.g., a CRT (cathode ray tube) or LCD (liquid crystal display) monitor, for displaying information to the consumer and a keyboard and a pointing device, e.g., a mouse or a trackball, by which the consumer can provide input to the computer. Other kinds of devices can be used to provide for interaction with a consumer as well; for example, feedback provided to the consumer can be any form of sensory feedback, e.g., visual feedback, auditory feedback, or tactile feedback; and input from the consumer can be received in any form, including acoustic, speech, or tactile input. In addition, a computer can interact with a consumer by sending documents to and receiving documents from a device that is used by the consumer; for example, by sending web pages to a web browser on a consumer's consumer device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a consumer can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

In various examples, a "QR code" as used herein can refer to a two-dimensional barcode, a matrix barcode, or other type of barcode or machine-readable optical label. When read or scanned (e.g., by an optical scanner), the QR code can provide information about an item to which the QR code is attached. For example, a QR code on a product or packaging for the product can provide information about the product.

In various examples, a "serial QR code" as used herein can refer to a QR code that is customized or serialized for a particular product item, such that each product item in a set of product items can have or be associated with a unique QR code. In some instances, for example, a serial QR code on a product item (e.g., a bottle of wine) can be used to uniquely identify the product item from similar product items (e.g., bottles of wine of the same type, brand, size, and/or product name).

In various examples, a "QR registry" as used herein can refer to a database that stores data related to QR codes for one or more products. The stored data can include, for example, an entry for each serial QR code associated with the one or more products. Each entry can include information related to a product item associated with the respective serial QR code. The information can include, for example, an indication of whether or not the product item has been purchased by a consumer, an indication of whether or not an offer has been redeemed for the product item, a purchase date, information related to the purchaser, and the like. The data in the QR registry can be updated as product items are produced and purchased, and as offers associated with the product items are made or redeemed.

In various examples, a "store" as used herein can refer to a business, a merchant, or any entity that offers items (e.g., goods or services) for purchase or other means of acquisition (e.g., rent, borrow, barter, etc.). The store can operate from a fixed location (e.g., a brick-and-mortar business), may be mobile (e.g., operated out of a vehicle), or may be virtual (e.g., an online store).

In various examples, a "boundary" for a store (alternatively referred to as a "store boundary") as used herein can refer to a physical boundary for the store or other area associated with the store. The physical boundary can be or include, for example, a perimeter of a building used by the store, an interior or exterior wall defining a border of the store, or an edge of a parking area used by consumers or customers who visit the store. In some examples, the boundary can be represented by a predefined distance from the store, such as, for example, a radial distance (e.g. 1 m, 10 m, 100 m, or more) from the store or store center.

In various examples, an "offer" as used herein can be, include, or relate to a promotion, a coupon, a price discount, a rebate, a cost savings, or other benefit received by a consumer, a customer, or other individual in exchange for purchasing or otherwise acquiring an item (e.g., a product or a service) from a store. When the offer is redeemed by the individual, the individual can receive the benefit (e.g., price discount) associated with the offer.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for providing post-purchase promotional offers, the method comprising:

receiving, at a server system, a notification in response to a client device performing a scan of a QR code associated with a product, wherein the notification indicates that a consumer has purchased the product at a store and is requesting a promotional offer; and activating, at the server system, a redemption process in response to receiving the notification, the redemption process comprising:

determining, by the server system, that the scan was performed when the client device was outside of a physical boundary associated with the store after a threshold period of time had passed since the purchase, wherein the client device comprises a satellite navigation receiver, wherein a location of the client device during the scan is determined using at least one of the satellite navigation receiver and a global positioning system, an IP address, or triangulation, and wherein determining that the client device was outside of the physical boundary comprises determining a distance between the client device and at least one of the physical boundary or a center of the store;

determining, by the server system, that a number of redemption requests from the store is below a threshold value; and sending, from the server system to the client device, in response to (i) the determination that the scan was performed when the client device was outside of the physical boundary after the threshold period of time and (ii) the determination that the number of redemption requests from the store is below the threshold value, a notification indicating that the consumer received the promotional offer.

2. The computer-implemented method of claim 1, wherein the store comprises a liquor store, a grocery store, a warehouse, a convenience store, or other business where the product is available for purchase.

3. The computer-implemented method of claim 1, wherein the QR code is a serial QR code that uniquely identifies a product item from other product items.

4. The computer-implemented method of claim 1, wherein determining, by the server system, that the scan was performed when the client device was outside of the physical boundary comprises receiving location data for the client device.

5. The computer-implemented method of claim 1, further comprising:

checking a QR registry associated with the QR code on the product; and confirming, by the server system and based on the QR registry, that the consumer has purchased the product, wherein the QR registry comprises a database that stores a listing and usage history of serial QR codes produced and applied to products.

6. The computer-implemented method of claim 5, wherein use of the QR code and the QR registry prevents or reduces false claims of product purchases.

7. The computer-implemented method of claim 5, further comprising updating the QR registry to indicate that an offer associated with the QR code has been redeemed.

8. The computer-implemented method of claim 1, further comprising:

receiving, by the server system, a digital copy of a receipt associated with the product and confirming, by the server system and based on the digital copy, that the consumer has purchased the product.

9. The computer-implemented method of claim 1, further comprising:

receiving, by the server system, an image of a physical receipt associated with the product; and confirming, by the server system and based on the image, that the consumer has purchased the product.

10. The computer-implemented method of claim 1, wherein the promotional offer comprises at least one of a reward, a discount, a rebate, and a coupon.

11. A system for providing post-purchase promotional offers, the system comprising:

at least one processor; and at least one memory coupled to the at least one processor and configured to store executable instructions that, when executed by the at least one processor, cause the at least one processor to:

receive a notification in response to a client device performing a scan of a QR code associated with a product sold at a store, wherein the notification indicates that a consumer has purchased the product at the store and is requesting a promotional offer; and activate a redemption process in response to receiving the notification, the redemption process causing the at least one processor to:

determine that the scan was performed when the client device was outside of a physical boundary associated with the store after a threshold period of time had passed since the purchase, wherein the client device comprises a satellite navigation receiver, wherein a location of the client device during the scan is determined using at least one of the satellite navigation receiver, a global positioning system, an IP address, or triangulation, and wherein determining that the client device was outside of the physical boundary comprises determining a distance between the client device and at least one of the physical boundary or a center of the store;

determine that a number of redemption requests from the store is below a threshold value; and send, to the client device, in response to (i) the determination that the scan was performed when the client device was outside of the physical boundary after the threshold period of time and (ii) the determination that the number of redemption requests from the store is below the threshold value, a notification indicating that the consumer received the promotional offer.

12. The system of claim 11, wherein the store comprises a liquor store, a grocery store, a warehouse, a convenience store, or other business where the product is available for purchase.

13. The system of claim 11, wherein the QR code is a serial QR code that uniquely identifies a product item from other product items.

14. The system of claim 11, wherein the instructions further cause the at least one processor to:

check a QR registry associated with the QR code on the product, wherein the QR registry comprises a database that stores a listing and usage history of all serial QR codes produced and applied to products; and confirm, based on the QR registry, that the consumer has purchased the product.

15. The system of claim 14, wherein the instructions further cause the at least one processor to update the QR registry to indicate that an offer associated with the QR code has been redeemed.

16. The system of claim 14, wherein the instructions further cause the at least one processor to use the QR code and the QR registry to prevent or reduce false claims of product purchases.

17. The system of claim 11, wherein the instructions further cause the at least one processor to:

receive a digital copy of a receipt associated with the product; and confirm, based on the digital copy, that the consumer has purchased the product.

18. The system of claim 11, wherein the instructions further cause the at least one processor to:

receive an image of a physical receipt associated with the product; and confirm, based on the image, that the consumer has purchased the product.

19. The system of claim 11, wherein, to determine that the scan was performed when the client device was outside of the physical boundary of the store, the instructions further cause the at least one processor to receive location data for the client device.

20. The system of claim 11, wherein the promotional offer comprises at least one of a reward, a discount, a rebate, and a coupon.

* * * * *